(12) United States Patent
Kurokawa et al.

(10) Patent No.: US 10,055,097 B2
(45) Date of Patent: Aug. 21, 2018

(54) GRASPING CONTENTS OF ELECTRONIC DOCUMENTS

(71) Applicant: International Business Machines Corporation, Armonk, NY (US)

(72) Inventors: Hiroshi Kurokawa, Tokyo (JP);
Takahisa Mizuno, Tokyo (JP);
Tomohiro Shioya, Tokyo (JP); Sayaka Tamai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 14/624,655

(22) Filed: Feb. 18, 2015

(65) Prior Publication Data
US 2015/0253942 A1    Sep. 10, 2015

(30) Foreign Application Priority Data

Mar. 10, 2014   (JP) ................................. 2014-046346

(51) Int. Cl.
*G06F 3/0483* (2013.01)
*G06F 3/0485* (2013.01)

(52) U.S. Cl.
CPC ........ *G06F 3/0483* (2013.01); *G06F 3/04855* (2013.01)

(58) Field of Classification Search
CPC ........................ G06F 3/0483; G06F 17/30696
See application file for complete search history.

(56) References Cited

U.S. PATENT DOCUMENTS 6,243,724 B1\* 6/2001 Mander ................. G06F 3/0483
707/E17.008
7,085,707 B2\* 8/2006 Milner .................. G09B 19/08
704/2
(Continued)

FOREIGN PATENT DOCUMENTS

JP      H07191974 A    7/1995
JP      H07262345 A   10/1995
(Continued)

OTHER PUBLICATIONS

Unknown, "Decision to Grant a Patent" for patent titled "Grasping Contents of Electronic Documents," Patent Application No. 2014-046346, dated Mar. 22, 2016, translated Jun. 2, 2016, 6 pages.

(Continued)

*Primary Examiner* — Abdullah Al Kawsar
*Assistant Examiner* — Sean Hsiao
(74) *Attorney, Agent, or Firm* — Nolan M. Lawrence

(57) ABSTRACT

A change operation changing a displayed portion of an electronic document from a first portion to a second portion is detected. First and second ranges of displayable portions of the electronic document are determined. The first range includes the first portion of the document and the second range includes the second portion of the document. A character string appears at a first frequency in the first range, and appears at a second frequency in the second range. Change information is generated that relates the second appearance frequency to the first appearance frequency.

5 Claims, 7 Drawing Sheets

(56) References Cited

U.S. PATENT DOCUMENTS

| | | | | |
|---|---|---|---|---|
| 8,402,030 | B1* | 3/2013 | Pyle | G06F 17/30675 |
| | | | | 707/738 |
| 9,087,508 | B1* | 7/2015 | Dzik | G10L 21/057 |
| 9,367,227 | B1* | 6/2016 | Kim | G06F 3/04883 |
| 9,449,526 | B1* | 9/2016 | Tseng | G09B 7/02 |
| 2004/0205451 | A1* | 10/2004 | Kowalski | G06F 17/2765 |
| | | | | 715/255 |
| 2004/0247206 | A1* | 12/2004 | Kaneda | G06F 17/30271 |
| | | | | 382/305 |
| 2008/0134033 | A1* | 6/2008 | Burns | G06F 17/30864 |
| | | | | 715/705 |
| 2009/0182727 | A1* | 7/2009 | Majko | G06F 17/30554 |
| 2011/0040562 | A1* | 2/2011 | Doyle | G11B 27/322 |
| | | | | 704/251 |
| 2011/0050593 | A1* | 3/2011 | Kim | G06F 3/0488 |
| | | | | 345/173 |
| 2011/0225174 | A1* | 9/2011 | Artzt | G06Q 30/02 |
| | | | | 707/750 |
| 2011/0261030 | A1* | 10/2011 | Bullock | G06F 15/0283 |
| | | | | 345/204 |
| 2012/0072859 | A1* | 3/2012 | Wang | G06K 9/00442 |
| | | | | 715/764 |
| 2012/0079372 | A1* | 3/2012 | Kandekar | G06F 17/2745 |
| | | | | 715/256 |
| 2012/0095983 | A1* | 4/2012 | Lee | G06F 17/30867 |
| | | | | 707/706 |
| 2012/0210203 | A1* | 8/2012 | Kandekar | G06F 17/30719 |
| | | | | 715/230 |
| 2012/0311438 | A1* | 12/2012 | Cranfill | G06F 17/30011 |
| | | | | 715/256 |
| 2014/0379707 | A1* | 12/2014 | Givoni | G06F 17/30014 |
| | | | | 707/726 |
| 2014/0380247 | A1* | 12/2014 | Tecarro | G06F 3/0483 |
| | | | | 715/863 |
| 2015/0213040 | A1* | 7/2015 | Whitelaw | G06F 17/3053 |
| | | | | 707/728 |
| 2015/0324342 | A1* | 11/2015 | Chin | G06F 17/30029 |
| | | | | 715/231 |

FOREIGN PATENT DOCUMENTS

| | | |
|---|---|---|
| JP | H09114859 A | 5/1997 |
| JP | 2000057140 A | 2/2000 |
| JP | 2001175673 A | 6/2001 |
| JP | 2002334106 A | 11/2002 |
| JP | 2004259031 A | 9/2004 |
| JP | 2006313485 A | 11/2006 |
| JP | 2007241902 A | 9/2007 |
| JP | 5066172 B2 | 1/2012 |
| JP | 2012141772 A | 7/2012 |
| JP | 2013003804 A | 1/2013 |
| JP | 2013109584 A | 6/2013 |

OTHER PUBLICATIONS

Kurokawa et al., "Device and Method for Assisting in Grasping Contents of Electronic Document," Japan Application No. 2014046346, filed Mar. 10, 2014.

Kurokawa et al., "Device and Method for Assisting in Grasping Contents of Electronic Document," Japan Application No. 2014046346, filed Mar. 10, 2014, 49 pages (English Translation).

* cited by examiner

GRASPING CONTENTS OF ELECTRONIC DOCUMENTS

BACKGROUND

The present disclosure relates to a device and method for assisting in the visualization of connection relations. Particularly, the present disclosure relates to a device and method for assisting in grasping the contents of an electronic document on a display device with the electronic document displayed thereon.

A desire to roughly grasp the contents of an electronic document, such as an electronic book, may occur. Such a desire may occur when a first-time reader tries to read an electronic document without taking much time, or when a reader who rereads an electronic document tries to find a target portion of the electronic document from a vague memory of when the reader read the electronic document before.

For example, when page-turning of an electronic document is performed page-by-page, the reader reads it from the top to the bottom while understanding the contents page-by-page, resulting in spending much time. Although it is considered to turn multiple pages of the electronic document at a time, this may skip the contents to be read or the target portion. Therefore, techniques for roughly grasping the contents of an electronic document have been conventionally proposed.

Japanese Patent Application Publication No. 2001-175673 discloses an electronic book display device, in which book information composed of document data is stored in a book data storage part, and the book information is read from the book data storage part and displayed on a book display part sequentially in specific units. When a specific word or phrase, such as a displayed character, is specified, a character data summary-generating algorithm extracts sentences containing the specified word or phrase from already-read portions to generate explanatory text, stores the generated explanatory text in a character data storage part, and displays the contents of the character data storage part to display desired explanatory text.

Japanese Patent Application Publication No. H07-191974 discloses a display device for analyzing a specified file using a document characteristic analysis program, storing the result in document characteristic information, deciding the display characteristic to a scroll area based on the document characteristic information in a memory, and switching and displaying the display characteristic inside the scroll area.

Japanese Patent Application Publication No. 2002-334106 discloses a topic-extracting device including, in addition to information-collecting means for collecting documents from information sources, information storage means for storing the collected documents, and topic-extracting means for extracting topics from documents taken out of the information storage means in parallel with processing performed by the information-collecting means to collect documents, identification means and difference-extracting means, wherein the difference-extracting means extracts a difference between the previously collected documents and the documents collected this time among documents whose sources are identified by the identification means, and outputs the difference to the topic-extracting means, and the topic-extracting means extracts topics from the input difference.

Japanese Patent Application Publication No. H07-262345 discloses a multimedia presentation editing method, in which screen presentation information as spatial layout information on multimedia data is edited by a screen data editing part, screen transition information describing a difference in position information between two-angle image media from two different pieces of screen presentation information is prepared by a differential data preparing part, a state transition time and transition start conditions are input from an input management part, and a scenario is prepared by a scenario preparing part from the screen presentation information and the screen transition information.

Japanese Patent Application Publication No. 2013-003804 discloses an electronic book display device, in which a display history when electronic book data is displayed on display means capable of displaying an electronic book is stored in storage means for each predetermined range, and when electronic book data carried on from the previously read part is displayed on the display means, any piece of summary data is selected based on the display history from among multiple pieces of summary data created for each predetermined range and different in amount of information, and displayed on the display means.

Japanese Patent Application Publication No. 2006-313485 discloses an electronic book display device for dividing data by prescribed page intervals, fetching data in each page interval or fetching the data of a page with a bookmark attached thereto, and generating multiple thumbnails, wherein among the multiple thumbnails, one is used as a main thumbnail whose size is large, and the other thumbnails in small size are arrayed almost like a V shape to be continued from the upper part and lower part of the main thumbnail diagonally upward and downward.

SUMMARY

Disclosed herein is a method for displaying a character string that appears in an electronic document. The electronic document has a plurality of displayable portions. A change operation is detected. The change operation changes a displayed portion of the electronic document from a first portion to a second portion. A first range of displayable portions and a second range of displayable portions is determined in response to detecting the change operation. The first range includes the first portion and the second range includes the second portion. The character string appears at a first appearance frequency in the first range, and appears at a second appearance frequency in the second range. Change information is generated for the character string. The change information relates the second appearance frequency to the first appearance frequency of the character string.

Also disclosed herein is a device for displaying a character string that appears in an electronic document. The electronic document has a plurality of displayable pages. A control section of the device is configured to control the displaying of the electronic document on a display device. A detection section of the device is configured to detect a page-turning operation. The page-turning operation continuously changes a displayed page of the electronic document from a former page to a latter page at a page-turning rate. A determination section of the device is configured to determine a first page group and a second page group in response to detecting the change operation. The determination is based at least partially on the page-turning rate. The first page group includes the former page and the second page group includes the latter page. The character string appears at a first appearance frequency in the first page group, and appears at a second appearance frequency in the second page group. A generation section of the device is configured to continuously generate change information for the character string. The change information relates the second appearance frequency to the first appearance frequency of the character string.

The present disclosure further provides a device for assisting in grasping the contents of an electronic document on a display device with the electronic document displayed thereon, including: a detection section for detecting a change operation for changing a portion of the electronic document to be displayed on the display device from a first portion to a second portion; a determination section for determining a first range including the first portion and a second range including the second portion when the change operation is detected; and a generation section for generating change information indicative of a change from a character string group appearing in the first range to a character string group appearing in the second range. This device may also be configured such that the detection section detects a change operation for continuously moving an object displayed on the display device to continuously change a portion of the electronic document to be displayed on the display device, and the generation section generates change information continuously showing the change from the character string group appearing in the first range to the character string group appearing in the second range. Further, the determination section may determine the first range and the second range according to the size of a portion changed per unit time by the change operation. Further, the generation section may generate change information including a specific character string appearing in the second range, in which an increase or decrease from the appearance frequency of the specific character string in the first range to the appearance frequency in the second range is represented by an attribute of the specific character string.

The present disclosure also provides a device for assisting in grasping the contents of an electronic document on a display device with the electronic document displayed thereon, including: a control section for performing control to display the electronic document on the display device; a detection section for detecting a page-turning operation for continuously moving an object displayed on the display device to continuously change a page of the electronic document to be displayed on the display device from a first page to a second page; a determination section which, when the page-turning operation is detected, determines a first page group including the first page and a second page group including the second page according to the number of pages turned over per unit time by the page-turning operation; and a generation section for generating change information continuously showing a change from a character string group appearing in the first page group to a character string group appearing in the second page group, wherein the control section performs control to display the change information on the display device.

The present disclosure further provides a method including the steps of: detecting a change operation for changing a portion of an electronic document to be displayed on a display device from a first portion to a second portion; determining a first range including the first portion and a second range including the second portion when the change operation is detected; and generating change information indicative of a change from a character string group appearing in the first range to a character string group appearing in the second range.

Further, the present disclosure provides a program for causing a computer to function as a device for assisting in grasping the contents of an electronic document on a display device with the electronic document displayed thereon, the program causing the computer to function as: a detection section for detecting a change operation for changing a portion of the electronic document to be displayed on the display device from a first portion to a second portion; a determination section for determining a first range including the first portion and a second range including the second portion when the change operation is detected; and a generation section for generating change information indicative of a change from a character string group appearing in the first range to a character string group appearing in the second range.

DETAILED DESCRIPTION

There are various disclosures for roughly grasping the contents of an electronic document. However, these disclosures merely mention that information extracted from a certain portion of an electronic document is displayed. In other words, these disclosures do not mention that information about a change in the contents of an electronic document when a displayed portion of the electronic document is changed from a certain portion to another portion is displayed, and cannot assist in understanding about the change in the contents of the electronic document. Further, these disclosures do not discriminate between a rough search and an elaborate search of the contents of the electronic document.

It is an object of the present disclosure to assist in understanding about a change in the contents of an electronic document. It is another object of the present disclosure to enable switching between a rough search and an elaborate search of the contents of an electronic document.

According to the present disclosure, it is possible to assist in understanding about a change in the contents of an electronic document. Embodiments of the present invention will be described in detail below with reference to the accompanying drawings. Embodiments display auxiliary information for assisting in understanding about the contents of an electronic book when page-turning of the electronic book is performed. In so doing, a change from words or phrases contained in the neighborhood of a page before page-turning to words or phrases contained in the neighborhood of a page after page-turning, that is, a difference between these words or phrases, is included in the auxiliary information. Further, this auxiliary information is changed by the number of pages turned over per unit time. In embodiments, the description will be made by taking an electronic document as the electronic book, a portion of the electronic document as a page of the electronic book, and a range including the portion of the electronic document as a page group, but the electronic document may be other than a so-called electronic book, the portion of the electronic document may be a portion determined by the number of lines or characters other than the page, and the range including the portion of the electronic document may be any range including the portion determined by the number of lines or characters other than the page.

Figure 1:
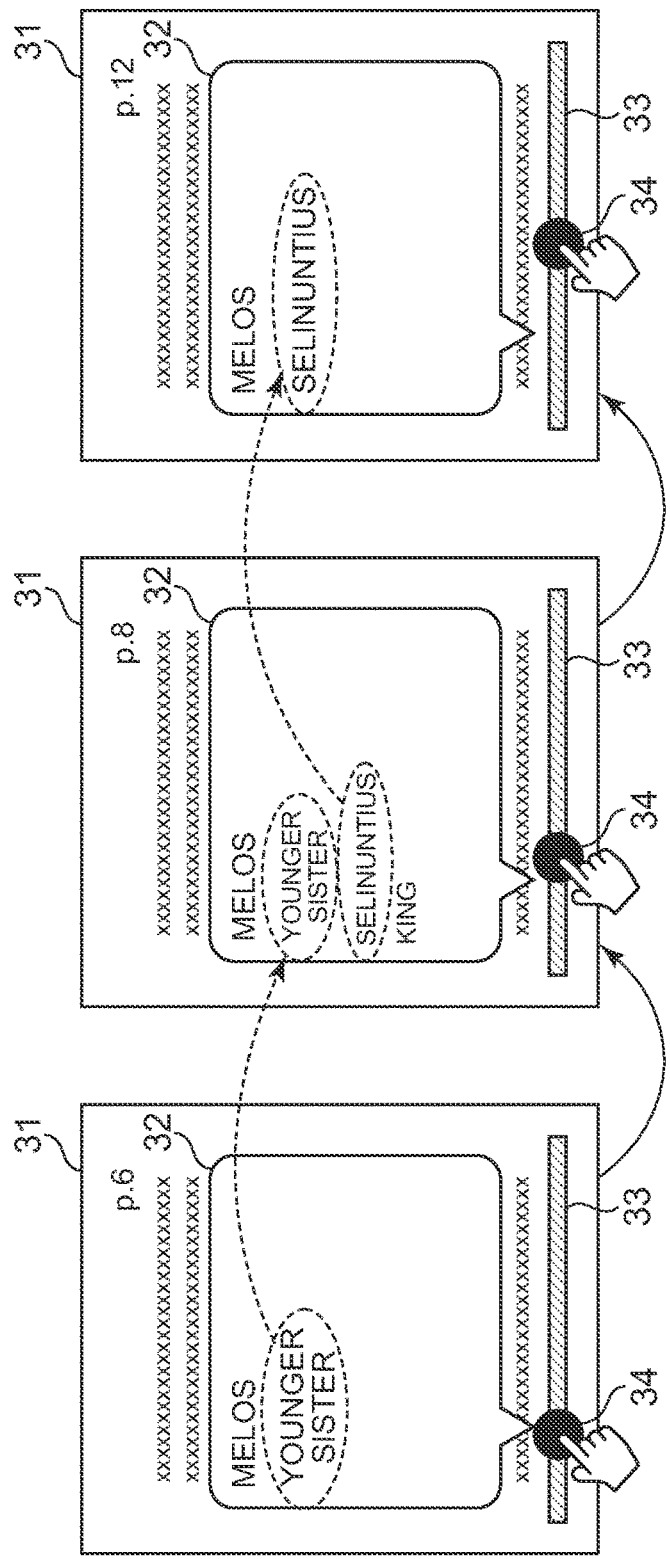
FIG. 1 contains diagrams showing a display example of auxiliary information in an embodiment of the present invention.

FIG. 1 contains diagrams showing a display example of auxiliary information in embodiments. Here, the names of characters in an electronic book are illustrated as words or phrases included in the auxiliary information. First, as shown in the left diagram, it is assumed that the sixth page of the electronic book is displayed in an electronic book display area 31, and "Melos" and "younger sister" as the names of characters included in this sixth page are displayed in an auxiliary information display area 32.

In this state, suppose that a user moves a knob 34 on a slider bar 33 to the right, little-by-little, to turn over to the eighth page. In this case, as in the middle diagram, the eighth page of the electronic book is displayed in the electronic book display area 31, and "Melos," "younger sister," "Selinuntius," and "King" as the names of characters included in this eighth page are displayed in the auxiliary information display area 32. In this regard, "Melos" is displayed in the same size as that shown in the left diagram because "Melos" is unchanged in appearance frequency from the sixth page. On the other hand, "younger sister" is displayed in a smaller size than that shown in the left diagram because the appearance frequency is lower than that on the sixth page. Further, "Selinuntius" and "King" are displayed in a smaller character size than that of "Melos" because both just start appearing on this eighth page. This makes it easy to understand a change before and after page-turning.

Suppose that the user further moves the knob 34 on the slider bar 33 to the right, little-by-little, to turn over to the twelfth page. In this case, as in the right diagram, the twelfth page of the electronic book is displayed in the electronic book display area 31, and "Melos" and "Selinuntius" as the names of characters included in this twelfth page are displayed in the auxiliary information display area 32. In this regard, "Melos" is displayed in the same character size as that in the middle diagram because the appearance frequency is unchanged from the eighth page. On the other hand, "Selinuntius" is displayed in a larger character size than that shown in the middle diagram because the appearance frequency becomes higher than that on the eighth page. This makes it easy to understand a change before and after page-turning.

As shown in embodiments, the character size is increased as the appearance frequency increases, while the character size is decreased as the appearance frequency decreases, but the present disclosure is not limited thereto. For example, the difference in appearance frequency may be represented by an attribute such as the decoration of each character, such as to make the character name thick as the appearance frequency increases, while making the character name thin as the appearance frequency decreases.

Further, in embodiments, page-turning is performed by an operation for moving the knob 34 on the slider bar 33, but the present disclosure is not limited thereto. Page-turning may be performed by an operation to any other object, such as an operation for moving a knob on a scroll bar to scroll character information in the electronic book display area 31.

Further, in the display example shown in FIG. 1, when a word or phrase displayed in the auxiliary information display area 32 is selected, the display may be moved to a position where the word or phrase appears in the electronic book.

In embodiments, a range of extracting words or phrases is changed according to the number of pages turned over per unit time by moving the knob 34 (hereinafter called the "page-turning rate").

Figure 2A:
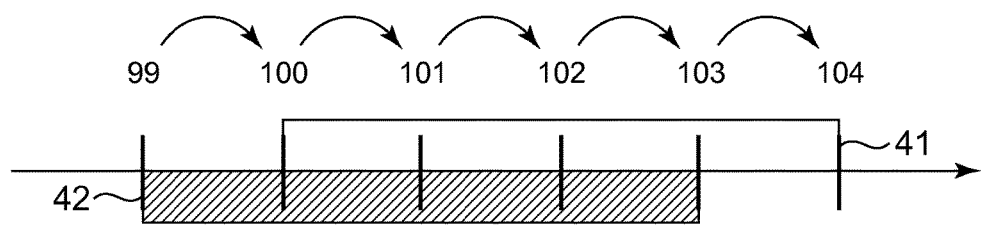
FIG. 2A is a diagram showing an example of a range of extracting words or phrases to be displayed and a range of extracting words or phrases to be compared when a knob is moved slowly.

FIG. 2A is a diagram showing an example of the range of extracting words or phrases to be displayed and the range of extracting words or phrases to be compared when page-turning is performed by moving the knob 34 slowly. FIG. 2A shows these ranges when the 101st page is turned over to the 102nd page, where a blank range 41 is the former range and a diagonal hatched range 42 is the latter range. In other words, when page-turning is performed by moving the knob 34 slowly, in this example, the range of extracting the words or phrases to be displayed is two pages before and after the page after page-turning and the range of extracting the words or phrases to be compared is two pages before and after the page before page-turning.

In this case, a comparison result between the appearance frequency of each word or phrase in the range 41 and the appearance frequency of each word or phrase in the range 42 is displayed by including it in auxiliary information. For example, when the appearance frequency of the word or phrase in the range 41 is changed from the appearance frequency of the word or phrase in the range 42, the display mode of the word or phrase is changed in the auxiliary information. Further, when the knob 34 is continuously moved, the comparison result is continuously changed as well. When the appearance frequency of the word or phrase in the range 41 and the appearance frequency of the word or phrase in the range 42 are compared, an overlapping range of the range 41 and the range 42 does not need to be considered.

Figure 2B:
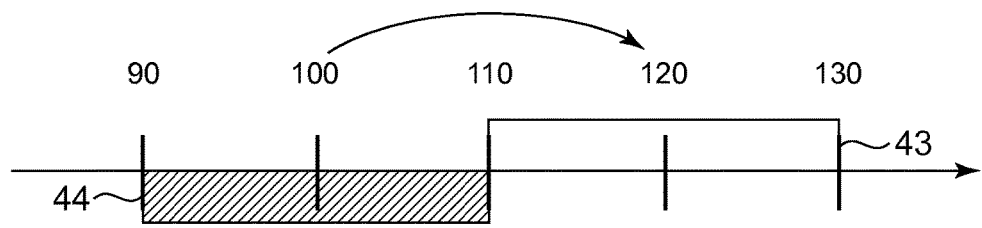
FIG. 2B is a diagram showing an example of the range of extracting words or phrases to be displayed and the range of extracting words or phrases to be compared when a knob is moved quickly.

FIG. 2B is a diagram showing an example of the range of extracting each word or phrase to be displayed and the range of extracting each word or phrase to be compared when page-turning is performed by moving the knob 34 quickly. FIG. 2B shows these ranges when the 100th page is turned over to the 120th page quickly, where a blank range 43 is the former range and a diagonal hatched range 44 is the latter range. In other words, when page-turning is performed by moving the knob 34 quickly, in this example, the range of extracting the word or phrase to be displayed is ten pages before and after the page after page-turning and the range of extracting the word or phrase to be compared is ten pages before and after the page before page-turning.

In this case, a comparison result between the appearance frequency of the word or phrase in the range 43 and the appearance frequency of the word or phrase in the range 44 are also displayed by including it in auxiliary information.

Figure 3:
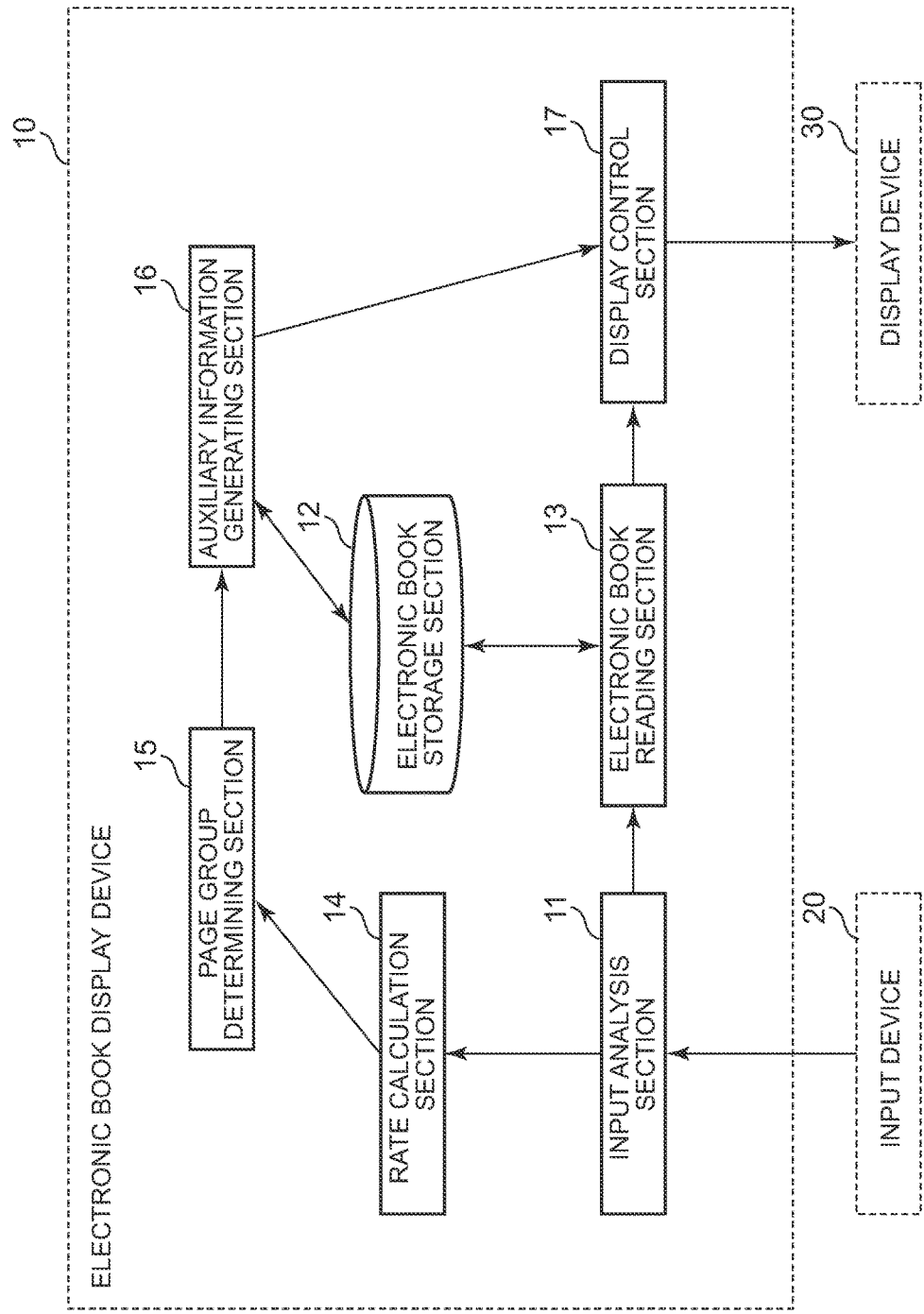
FIG. 3 is a block diagram showing a functional configuration example of an electronic book display system in an embodiment of the present invention.

FIG. 3 is a block diagram showing a functional configuration example of an electronic book display system for performing the operation as mentioned above. As shown, this electronic book display system includes an electronic book display device 10, an input device 20, and a display device 30.

The electronic book display device 10 includes an input analysis section 11, an electronic book storage section 12, an electronic book reading section 13, a rate calculation section 14, a page group determining section 15, an auxiliary information generating section 16, and a display control section 17.

The input analysis section 11 receives a user's input operation from the input device 20 to determine subsequent processing according to the input operation. Specifically, when the user's input operation is an operation for instructing the display of an electronic book, information indicative of the operation is output to the electronic book reading section 13, while when the user's input operation is an operation for moving the knob 34 on the slider bar 33, information indicative of the operation is output to the electronic book reading section 13 and the rate calculation section 14. In embodiments, the input analysis section 11 is provided as an example of a detection section for detecting a change operation for changing a portion of an electronic document from a first portion to a second portion, or an example of a detection section for detecting a page-turning operation for continuously turning over the electronic document from a first page to a second page.

The electronic book storage section 12 stores a database including character information on the electronic book. Though not shown, identification information (book ID) on the electronic book, a page number of the electronic book, and character information included in a page with the page number are associated in this database.

When receiving the information indicative of the operation for instructing the display of the electronic book from the input analysis section 11, the electronic book reading section 13 reads the electronic book having the specified book ID and outputs this to the display control section 17. When receiving the information indicative of the operation for moving the knob 34 on the slider bar 33 from the input analysis section 11, the electronic book reading section 13 displays a state of page-turning of the electronic book according to this operation.

The rate calculation section 14 periodically receives the information indicative of the operation for moving the knob 34 on the slider bar 33 from the input analysis section 11, calculates a page-turning rate based on the position of the knob 34 when receiving the previous information, the position of the knob 34 when receiving the information this time, and the interval at which the information is received periodically, and outputs the page-turning rate to the page group determining section 15.

When receiving the page-turning rate from the rate calculation section 14, the page group determining section 15 determines, according to this page-turning rate, a page group for extracting words or phrases before and after the page before page-turning (hereinafter called the "page group before page-turning") and a page group for extracting words or phrases before and after the page after page-turning (hereinafter called the "page group after page-turning"). Specifically, these page groups are determined so that more pages will be included when the page-turning rate is higher than when the page-turning rate is lower. In embodiments, the page group determining section 15 is provided as an example of a determination section for determining a first range including a first portion and a second range including a second portion, or an example of a determination section for determining a first page group including a first page and a second page group including a second page.

The auxiliary information generating section 16 extracts each word or phrase appearing in the page group before page-turning and appearing in the page group after page-turning from the database stored in the electronic book storage section 12. Here, the extracted word or phrase can be determined by analyzing the appearance frequency or decoration (such as the bold face or the italic face) of the word or phrase appearing in each page group. Further, a word or phrase obtained from the end of the electronic book may be determined to be the word or phrase. Then, auxiliary information for assisting in understanding about the contents of the electronic book is generated based on the extracted word or phrase, and is output to the display control section 17. In this regard, information indicative of a change from the word or phrase appearing in the page group before page-turning to the word or phrase appearing in the page group after page-turning is included in the auxiliary information. In embodiments, the auxiliary information is used as an example of change information indicative of a change from a character string group appearing in the first range to a character string group appearing in the second range, or an example of change information continuously showing a change from a character string group appearing in the first page group to a character string group appearing in the second page group, and the auxiliary information generating section 16 is provided as an example of a generation section for generating the change information.

When receiving the electronic book from the electronic book reading section 13, the display control section 17 performs control to display this electronic book on the display device 30. On this occasion, when receiving the auxiliary information from the auxiliary information generating section 16, the display control section 17 performs control to combine the auxiliary information into the contents of the electronic book in order to display, on the display device 30, an image after being combined. In embodiments, the display control section 17 is provided as an example of a control section for performing control to display an electronic document on a display device, or an example of a control section for performing control to display change information on the display device.

The input device 20 is a device used by the user to enter various kinds of information into the electronic book display device 10. The display device 30 is a device for displaying information acquired or generated by the electronic book display device 10.

Operation of Electronic Book Display System

First, suppose that the user has carried out an operation for instructing the display of an electronic book using the input device 20. In the electronic book display device 10, the input analysis section 11 receives information indicative of this operation, and outputs it to the electronic book reading section 13. Then, the electronic book reading section 13 reads, from the electronic book storage section 12, the electronic book specified in the information received from the input analysis section 11, and outputs it to the display control section 17. After that, the display control section 17 performs control to display, on the display device 30, the electronic book received from the electronic book reading section 13, thus displaying the electronic book on the display device 30.

In this state, suppose that the user has carried out an operation for moving the knob 34 on the slider bar 33. In the electronic book display device 10, the input analysis section 11 receives information indicative of this operation, and outputs it to the electronic book reading section 13. Then, the electronic book reading section 13 reads, from the electronic book storage section 12, a page of the electronic book specified in the information received from the input analysis section 11, and outputs it to the display control section 17. On the other hand, the input analysis section 11 outputs information indicative of the operation for moving the knob 34 to the rate calculation section 14 periodically. This causes the rate calculation section 14 to calculate the number of pages turned over based on the value of movement from the position of the knob 34 when information was received the last time to the position of the knob 34 when information is received this time. Then, the number of pages is divided by the length of time from when the information was received the last time until the information is received this time to calculate a page-turning rate and output the page-turning rate to the page group determining section 15.

Figure 4:
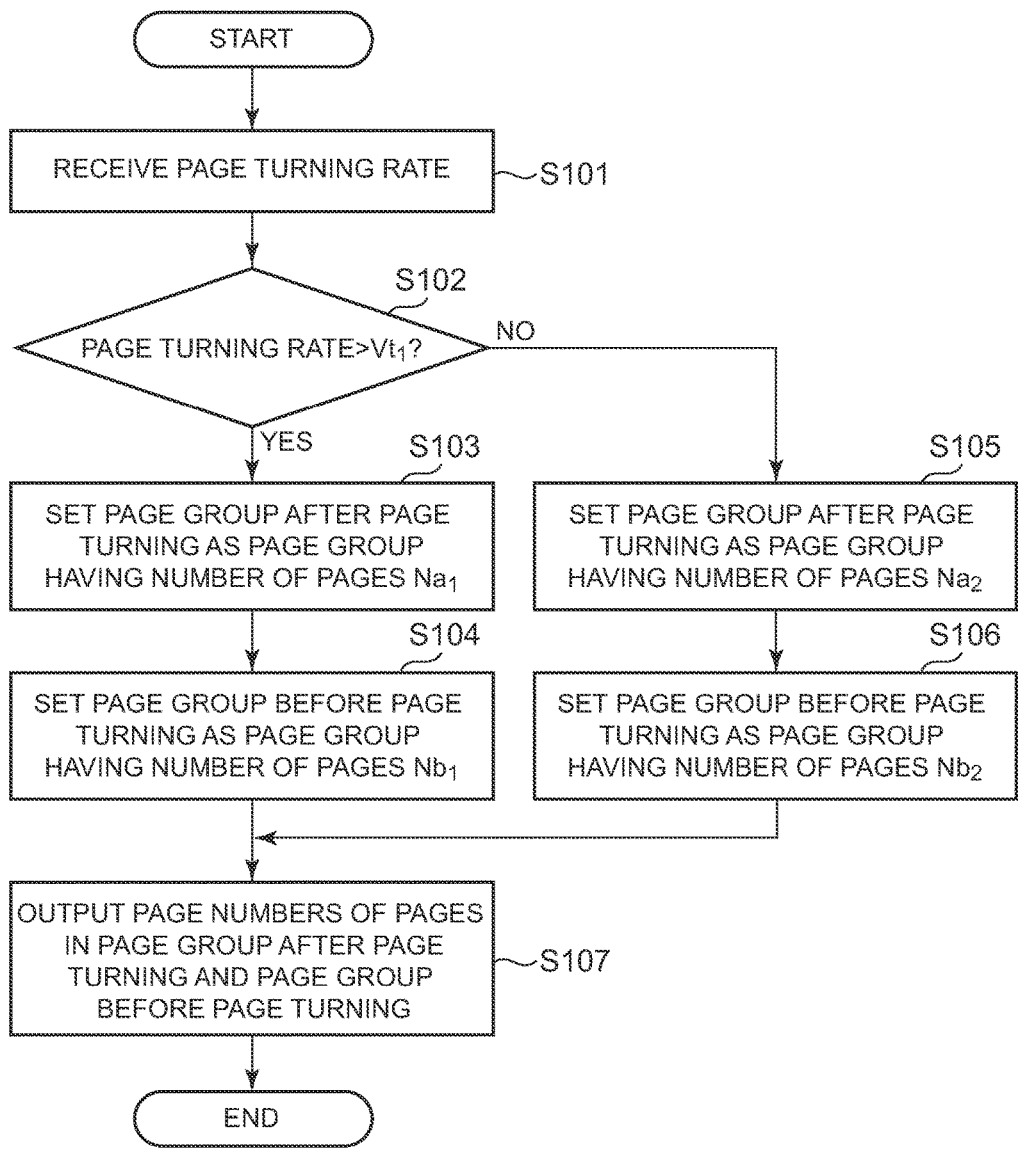
FIG. 4 is a flowchart showing an operational example of a page group determining section in an electronic book display device according to an embodiment of the present invention.

FIG. 4 is a flowchart showing an operational example of the page group determining section 15. Here, a threshold value for the page-turning rate is set to $Vt_1$. Further, when the page-turning rate is high, the number of pages included in the page group after page-turning is set to $Na_1$, while when the page-turning rate is low, it is set to $Na_2$ ($Na_1$>$Na_2$). Further, when the page-turning rate is high, the number of pages included in the page group before page-turning is set to $Nb_1$, while when the page-turning rate is low, it is set to $Nb_2$ ($Nb_1$>$Nb_2$). Then, these threshold value and numbers of pages are stored in a memory accessible by the page group determining section 15.

As shown, the page group determining section 15 first receives the page-turning rate from the rate calculation section 14 at s101. Next, the page group determining section 15 determines whether the page-turning rate received at s101 exceeds the threshold value $Vt_1$ at s102. When determining that the page-turning rate exceeds the threshold value $Vt_1$, the page group determining section 15 determines the page group having the number of pages $Na_1$ to be the page group after page-turning at s103. Further, the page group determining section 15 determines the page group having the number of pages $Nb_1$ to be the page group before page-turning at s104.

On the other hand, when determining that the page-turning rate is less than or equal to the threshold value $Vt_1$, the page group determining section 15 determines the page group with the number of pages $Na_2$ to be the page group after page-turning at s105. Further, the page group determining section 15 determines the page group having the number of pages $Nb_2$ to be the page group before page-turning at s106.

After that, the page group determining section 15 outputs, at s107, to the auxiliary information generating section 16, the page numbers of pages included in the page group after page-turning determined at s103 and the page numbers of pages included in the page group before page-turning determined at s104, or the page numbers of pages included in the page group after page-turning determined at s105 and the page number of pages included in the page group before page-turning determined at s106.

Figure 5:
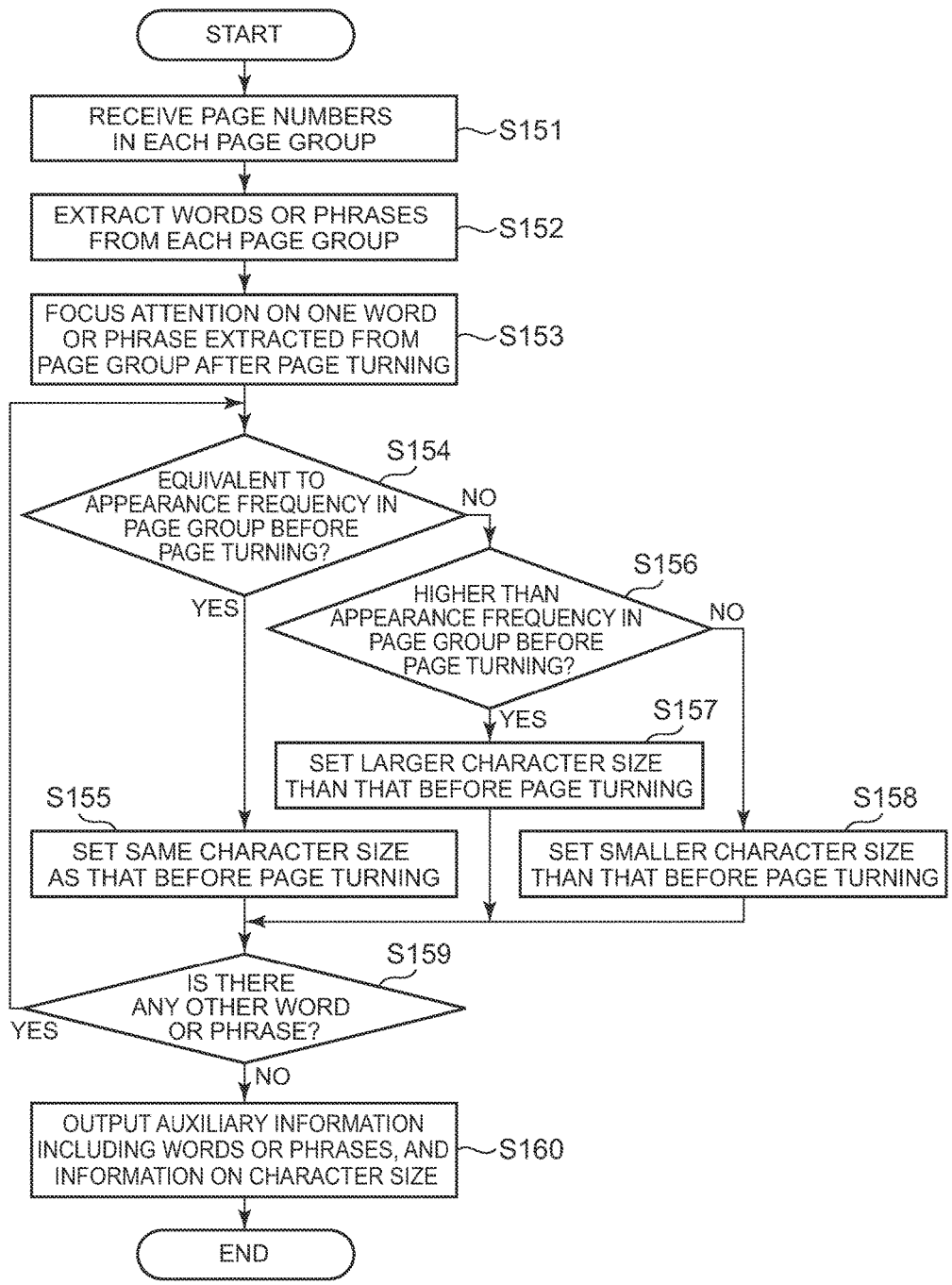
FIG. 5 is a flowchart showing an operational example of an auxiliary information generating section in the electronic book display device according to an embodiment of the present invention.

FIG. 5 is a flowchart showing an operational example of the auxiliary information generating section 16 at this time. As shown, the auxiliary information generating section 16 first receives, from the page group determining section 15, the page numbers of the pages included in the page group after page-turning and the page numbers of the pages included in the page group before page-turning at s151.

Next, the auxiliary information generating section 16 extracts words or phrases appearing on the pages having the page numbers received at s151 among the pages of the electronic book stored in the electronic book storage section 12 at s152. Here, it is assumed that the auxiliary information generating section 16 extracts the words or phrases by distinguishing between the words or phrases appearing on the pages in the page group after page-turning and the words or phrases appearing on the pages in the page group before page-turning. In this case, only words or phrases that meet predefined conditions among the words or phrases appearing on the pages may be extracted as mentioned above.

Next, the auxiliary information generating section 16 focuses attention on one of the words or phrases extracted from the pages in the page group after page-turning at s153. Then, the auxiliary information generating section 16 determines whether the appearance frequency of this word or phrase in the page group after page-turning is equivalent to the appearance frequency of this word or phrase in the page group before page-turning at s154. Here, it is assumed that the former appearance frequency and the latter appearance frequency are determined to be equivalent when a difference therebetween is within predefined reference values. When determining that the appearance frequency of this word or phrase in the page group after page-turning is equivalent to the appearance frequency of this word or phrase in the page group before page-turning, the auxiliary information generating section 16 includes, in the auxiliary information after page-turning, information for displaying the word or phrase in the same character size as the character size when this word or phrase included in the auxiliary information before page-turning is displayed at s155.

On the other hand, when determining that the appearance frequency of this word or phrase in the page group after page-turning is not equivalent to the appearance frequency of this word or phrase in the page group before page-turning, the auxiliary information generating section 16 determines whether the appearance frequency of this word or phrase in the page group after page-turning is higher than the appearance frequency of this word or phrase in the page group before page-turning at s156. When determining that the appearance frequency of this word or phrase in the page group after page-turning is higher than the appearance frequency of this word or phrase in the page group before page-turning, the auxiliary information generating section 16 includes, in the auxiliary information after page-turning, information for displaying the word or phrase in a larger character size than the character size when this word or phrase included in the auxiliary information before page-turning is displayed at s157. Further, when determining that the appearance frequency of this word or phrase in the page group after page-turning is lower than the appearance frequency of this word or phrase in the page group before page-turning, the auxiliary information generating section 16 includes, in the auxiliary information after page-turning, information for displaying the word or phrase in a smaller character size than the character size when this word or phrase included in the auxiliary information before page-turning is displayed at s158.

After that, the auxiliary information generating section 16 determines whether there is any other word or phrase extracted from the pages in the page group after page-turning at s159. When determining that there is any other word or phrase, the auxiliary information generating section 16 performs processing on the word or phrase at s154 to s158. When determining that there is no other word or phrase, the auxiliary information generating section 16 outputs, at s160, to the display control section 17, the words or phrases extracted from the pages in the page group after page-turning, and auxiliary information including information on the character sizes set in any of s155, s157, and s158.

Then, the display control section 17 performs control to display, on the display device 30, an image obtained by combining the page of the electronic book received from the electronic book reading section 13 with the auxiliary information received from the auxiliary information generating section 16, thus displaying this combined image on the display device 30.

In the operational example of FIG. 4, the numbers of pages included in the page group before page-turning and the page group after page-turning are determined based on the comparison result between the page-turning rate and one threshold value $Vt_1$. However, the numbers of pages included in the page group before page-turning and in the page group after page-turning may be determined based on comparison results between the page-turning rate and multiple threshold values. For example, the threshold values are set to $Vt_1, Vt_2, \ldots, Vt_n$ (where n is a natural number) from the largest one. In this case, it is only necessary to set the number of pages included in the page group after page-turning to $Na_1$ when the page-turning rate is higher than the threshold value $Vt_1$, to $Na_{i+1}$ when the page-turning rate is less than or equal to the threshold value $Vt_1$ (where i=1, 2, ..., n−1) and larger than the threshold value $Vt_{i+1}$, and to $Na_{n+1}$ when the page-turning rate is less than or equal to the threshold value $Vt_n$. Further, it is only necessary to set the number of pages included in the page group before page-turning to $Nb_1$ when the page-turning rate is higher than the threshold value $Vt_1$, to $Nb_{i+1}$ when the page-turning rate is less than or equal to the threshold value $Vt_i$ (where i=1, 2, ..., n−1) and higher than the threshold value $Vt_{i+1}$, and to $Nb_{n+1}$ when the page-turning rate is less than or equal to the threshold value $Vt_n$.

Further, in the operational example of FIG. 5, when the appearance frequency of the word or phrase in the page group after page-turning is higher than the appearance frequency of the word or phrase in the page group before page-turning, the character size is increased, while when the appearance frequency of the word or phrase in the page group after page-turning is lower than the appearance frequency of the word or phrase in the page group before page-turning, the character size is decreased. However, the character size may be changed in multiple steps according to the degree of the difference between the appearance frequency in the page group after page-turning and the appearance frequency in the page group before page-turning.

In the aforementioned embodiment, the page group for extracting words or phrases to be displayed is set to a page group before and after the page after page-turning, and the page group for extracting words or phrases to be compared is set to a page group before and after the page before page-turning, but the present disclosure is not limited thereto. For example, various variations can be considered in terms of to what page groups the page group for extracting words or phrases to be displayed and the page group for extracting words or phrases to be compared are set when the knob 34 is moved quickly to perform page-turning.

Figure 6A:
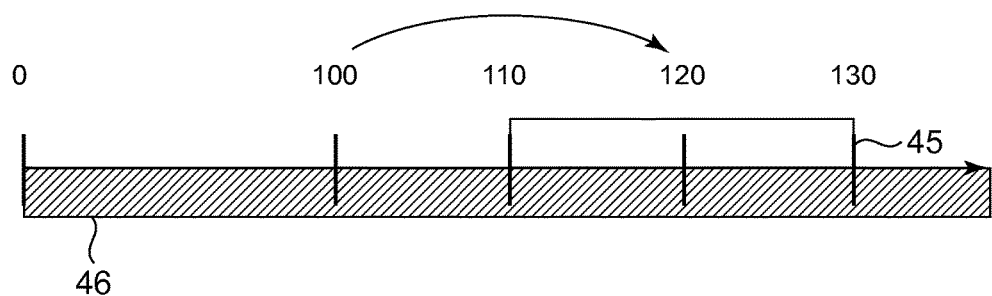
FIG. 6A and FIG. 6B are diagrams showing variations of the range of extracting words or phrases to be displayed and the range of extracting words or phrases to be compared when a knob is moved quickly to perform page-turning.

FIG. 6A is a diagram showing a first variation of the range of extracting words or phrases to be displayed and the range of extracting words or phrases to be compared when page-turning is performed by moving the knob 34 quickly. FIG. 6A shows these ranges when the 100th page is quickly turned over to the 120th page, where a blank range 45 is the former range and a diagonal hatched range 46 is the latter range. In other words, when page-turning is performed by moving the knob 34 quickly, the range of extracting words or phrases to be displayed is ten pages before and after the page after page-turning like in FIG. 2B, but the range of extracting words or phrases to be compared is all the pages of the electronic book unlike in FIG. 2B. This first variation is, for example, to display words or phrases the appearance frequencies of which are high on ten pages before and after the page after page-turning compared to the entire electronic book, or to display a newly-appearing word or phrase.

Specifically, when the user turns many pages, words or phrases that feature the page after page-turning are displayed. This allows the user to guess a portion the user looks for, and the user slows the page-turning rate. Then, when the user turns a few pages, a word or phrase as a difference before and after page-turning is displayed to allow the user to find the word or phrase the user looks for.

Figure 6B:
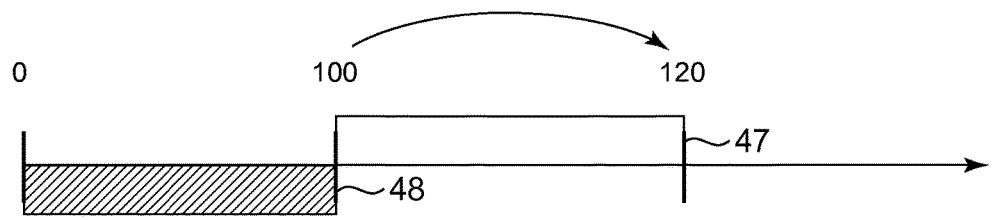

FIG. 6B is a diagram showing a second variation of the range of extracting words or phrases to be displayed and the range of extracting words or phrases to be compared when page-turning is performed by moving the knob 34 quickly. FIG. 6B also shows these ranges when the 100th page is quickly turned over to the 120th page, where a blank range 47 is the former range and a diagonal hatched range 48 is the latter range. In other words, when page-turning is performed by moving the knob 34 quickly, the range of extracting words or phrases to be displayed is 20 pages from the page before page-turning to the page after page-turning, and the range of extracting words or phrases to be compared is from the first page of the electronic book to the page before page-turning unlike in FIG. 2B. This second variation is, for example, to display words or phrases that do not appear until the page before page-turning but appear on the pages skipped by page-turning to assist in the understanding of the portion skipped by page-turning.

The above description shows an example of the range of extracting words or phrases to be displayed and the range of extracting words or phrases to be compared when page-turning is performed slowly and quickly, respectively. However, it is possible to replace slow page-turning with page-by-page movement, replace quick page-turning with multiple page movement at a time, and employ the same ranges as the range of extracting words or phrases to be displayed and the range of extracting words or phrases to be compared. Here, it is assumed that multiple page movement means that multiple pages are moved collectively, such as ten pages or 20 pages, and page skip means to jump pages to a chapter or a page by specifying the chapter or the page.

As described above, in embodiments, auxiliary information indicative of a change from a character string group appearing in a first page group including a first page to a character string group appearing in a second page group including a second page is displayed according to a page-turning operation for turning from the first page to the second page of an electronic document displayed on the display device. This can assist in understanding about the change in the contents of the electronic document.

Further, in embodiments, the first page group and the second page group are determined according to the number of pages turned over per unit time by the page-turning operation. This can switch between a rough search and an elaborate search of the contents of the electronic document.

Hardware Configuration of Electronic Book Display Device of Embodiment

Figure 7:
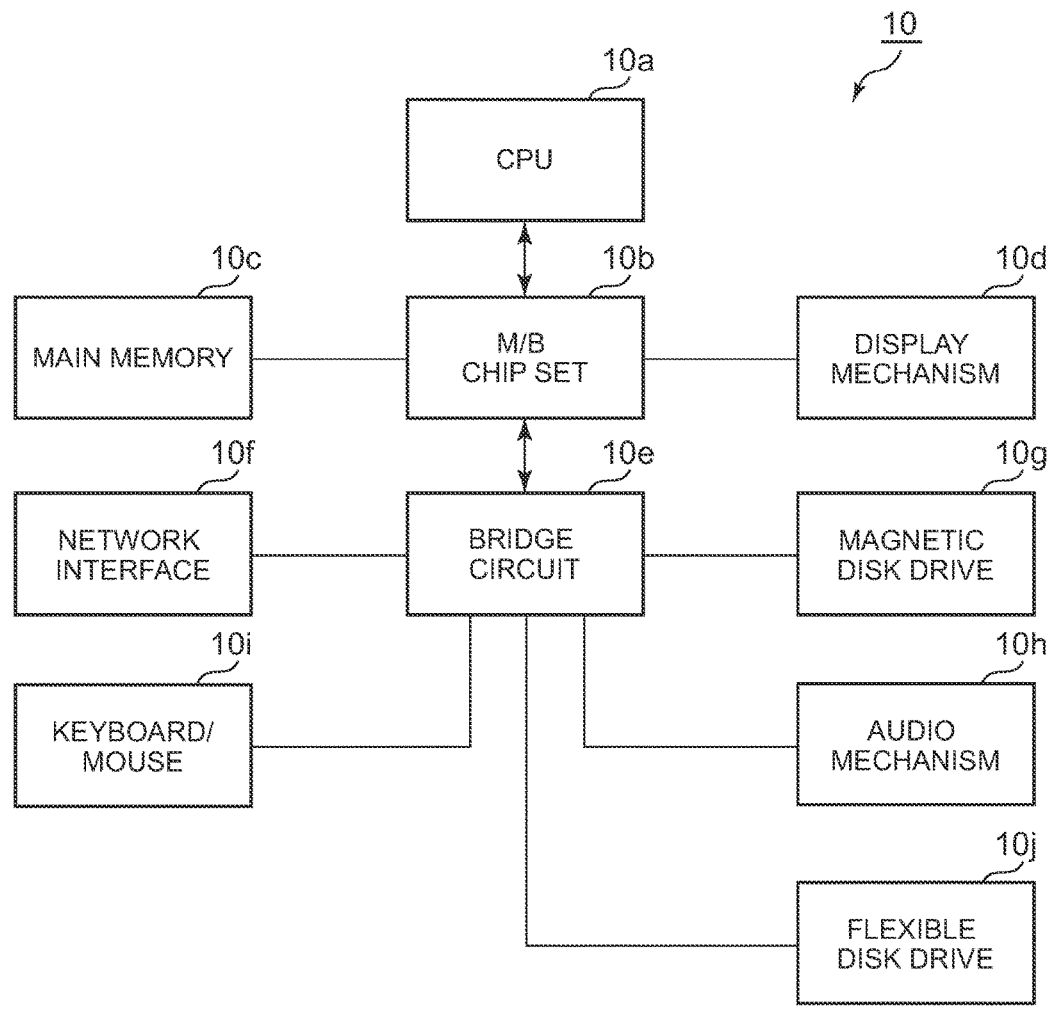
FIG. 7 is a block diagram showing a hardware configuration example of the electronic book display device according to an embodiment of the present invention.

FIG. 7 is a diagram showing a hardware configuration example of the electronic book display device 10 in embodiments. As shown, the electronic book display device 10 includes a CPU (Central Processing Unit) 10a as computing means, a main memory 10c connected to the CPU 10a through an M/B (motherboard) chip set 10b, and a display mechanism 10d (corresponding to the display device 30 in FIG. 3) connected to the CPU 10a also through the M/B chip set 10b. Connected also to the M/B chip set 10b through a bridge circuit 10e are a network interface 10f, a magnetic disk drive (HDD) 10g, an audio mechanism 10h, a keyboard/mouse 10i (corresponding to the input device 20 in FIG. 3), and a flexible disk drive 10j.

In FIG. 7, each component is connected through a bus. For example, the connection between the CPU 10a and the M/B chipset 10b, and the connection between the M/B chip set 10b and the main memory 10c are made through a CPU bus. The connection between the M/B chip set 10b and the display mechanism 10d may be made through an AGP (Accelerated Graphics Port). However, when the display mechanism 10d includes a PCI Express video card, the connection between the M/B chip set 10b and this video card is made through a PCI Express (PCIe) bus. In the case of connection to the bridge circuit 10e, PCI Express can be used, for example, for the network interface 10f. Further, serial ATA (AT Attachment), parallel transfer ATA, or PCI (Peripheral Components Interconnect) can be used, for example, for the magnetic disk drive 10g. Further, USB (Universal Serial Bus) can be used for the keyboard/mouse 10i and the flexible disk drive 10j.

Here, embodiments of the present invention may be implemented all in hardware or all in software. It can also be implemented both in hardware and software. Further, embodiments of the present invention can be implemented as a computer, a data processing system, or a computer program. This computer program can be stored on a computer-readable medium and provided. Here, as the medium, an electronic, magnetic, optical, electromagnetic, infrared or semiconductor system (device or equipment), or a propagation medium is considered. Further, as the computer-readable media, a semiconductor or solid-state storage device, a magnetic tape, a removable computer diskette, a random access memory (RAM), a read-only memory (ROM), a rigid magnetic disk, and an optical disk are exemplified. Examples of optical disks so far include compact disk read-only memory (CD-ROM), compact disk read/write (CD-R/W), and DVD.

While the present invention has been described with respect to embodiments, the technical scope of the present invention is not limited to the aforementioned embodiment. It will be obvious to those skilled in the art that various changes and modifications can be made without departing from the spirit and scope of the present invention.

What is claimed is:

1. A device for displaying a character string to assist in grasping contents of an electronic document displayed on a display of the device, the display device having a processor and a non-transitory computer memory having program instructions embodied therewith, the program instructions executable by the processor to cause the device to:
   detect a change operation, based on an input from a user to the display device, to change a part of the electronic document displayed on the display device from a first part to a second part, the first part displayed by the display of the device;
   determine a size of a part of the electronic document changed per unit time by the change operation is larger than a threshold value or less than or equal to the threshold value;
   determine, in response to detection of the change operation, a first range of portions of the electronic document before receiving the input from the user to change to the second part of the electronic document and determine a second range of the electronic document in response to detection of the change operation and after receiving the input from the user, the first range and the second range having a first size when the size of a part of the electronic document changed per unit time by the change operation is larger than the threshold value, the first range and the second range having a second size when the size of a part of the electronic document changed per unit time by the change operation is less than or equal to the threshold value, the first size being larger than the second size,
   wherein the first range includes a first portion of the document before the first part and a second portion of document after the first part and wherein the second range includes a first portion of the document before the second part and second portion of the document after the second part;
   wherein the character string having a first appearance frequency in the first range, the character string having a second appearance frequency in the second range;
   generate change information for the character string by increasing or decreasing a size of the character string displayed on the display device, the change information relating a difference between the second appearance frequency and the first appearance frequency to a determination of a display attribute of the character string in the second part; and
   display the character string in the second part using the display attribute determined based on the change information.

2. The device according to claim 1, wherein the program instructions are further executable by the processor to cause the device to: detect the change operation continuously the part of the electronic document displayed on the device; and continuously generate the change information for the character string.

3. The device according to claim 1, wherein the program instructions are further executable by the processor to cause the device to: set a size of the second range to a third size when the size of a part of the electronic document changed per unit time by the change operation is larger than the threshold value; and set the size of the second range to a fourth size when the size of a part of the electronic document changed per unit time by the change operation is not larger than the threshold value, wherein the third size is larger than the fourth size.

4. The device according to claim 1, wherein the program instructions are further executable by the processor to cause the device to generate the change information including display attributes of the character string in the second range, wherein the display attribute indicates whether the first appearance frequency is greater than or less than the second appearance frequency.

5. A device for assisting in grasping contents of an electronic document on a display device with the electronic document displayed thereon, the device having a processor and a non-transitory computer memory having program instructions embodied therewith, the program instructions executable by the processor to cause the device to:

detect a change operation, based on an input from a user to the display device, to change a part of the electronic document displayed on the display device from a first part to a second part, the first part displayed by the display of the device:

determine a size of a part of the electronic document changed per unit time by the change operation is larger than a threshold value or less than or equal to the threshold value;

determine, in response to detection of the change operation, a first range of portions of the electronic document before receiving the input from the user to change to the second part of the electronic document and determine a second range of the electronic document in response to detection of the change operation and after receiving the input from the user, the first range and the second range having a first size when the size of a part of the electronic document changed per unit time by the change operation is larger than the threshold value, the first range and the second range having a second size when the size of a part of the electronic document changed per unit time by the change operation is less than or equal to the threshold value, the first size being larger than the second size, wherein the first range includes a first portion of the document before the first part and a second portion of document after the first part and wherein the second range includes a first portion of the document before the second part and second portion of the document after the second part;

wherein the character string having a first appearance frequency in the first range, the character string having a second appearance frequency in the second range;

generate change information for the character string by increasing or decreasing a size of the character string displayed on the display device, the change information relating a difference between the second appearance frequency and the first appearance frequency to a determination of a display attribute of the character string in the second part; and display the character string in the second part using the display attribute determined based on the change information.

\* \* \* \* \*